United States Patent
Carraro et al.

(10) Patent No.: US 6,462,785 B1
(45) Date of Patent: Oct. 8, 2002

(54) MOTION DISPLAY TECHNIQUE

(75) Inventors: Gianpaolo U. Carraro, Red Bank, NJ (US); John T. Edmark, New York, NY (US); James Robert Ensor, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 08/869,056

(22) Filed: Jun. 4, 1997

(51) Int. Cl.[7] .............................. H04N 9/00; H04N 5/14
(52) U.S. Cl. ..................... 348/578; 348/558; 348/595; 348/459; 348/699; 375/240.16
(58) Field of Search ................................ 348/578, 558, 348/594, 595, 625, 630, 667, 673, 121, 122, 459, 699; 375/240–241

(56) References Cited

U.S. PATENT DOCUMENTS

| | | | | |
|---|---|---|---|---|
| 4,591,913 A | * | 5/1986 | Pohl | 348/594 |
| 4,698,682 A | * | 10/1987 | Astle | 348/586 |
| 4,780,763 A | * | 10/1988 | McFetridge | 348/594 |
| 4,951,144 A | * | 8/1990 | Des Jardins | 348/578 |
| 5,008,755 A | * | 4/1991 | Brian | 348/578 |
| 5,105,313 A | * | 4/1992 | Stewart | 348/578 |
| 5,125,041 A | * | 6/1992 | Kimura et al. | 348/578 |
| 5,191,416 A | * | 3/1993 | Dickson et al. | 348/459 |
| 5,245,432 A | * | 9/1993 | Jaffary et al. | 348/578 |
| 5,367,343 A | * | 11/1994 | Blair | 348/700 |
| 5,428,399 A | * | 6/1995 | Robinson et al. | 348/459 |
| 5,440,336 A | * | 8/1995 | Buhro et al. | 348/13 |
| 5,502,503 A | * | 3/1996 | Koz | 348/552 |
| 5,547,382 A | * | 8/1996 | Yamasaki et al. | 348/121 |
| 5,550,982 A | * | 8/1996 | Long et al. | 395/200.13 |
| 5,646,697 A | * | 7/1997 | Kurashige | 348/459 |
| 5,701,163 A | * | 12/1997 | Richards et al. | 348/578 |
| 5,767,921 A | * | 6/1998 | Shyu | 348/578 |
| 5,777,689 A | * | 7/1998 | Dunbar | 348/625 |
| 5,793,436 A | * | 8/1998 | Kim | 348/459 |
| 5,821,986 A | * | 10/1998 | Yuan et al. | 348/17 |
| 5,844,618 A | * | 12/1998 | Horiike et al. | 348/459 |
| 6,005,638 A | * | 12/1999 | Blair et al. | 348/607 |

OTHER PUBLICATIONS (Halsall; Internetworking; Data Communications, Computer Networks and Open Systems; pp. 499–501), 1996.*

* cited by examiner

*Primary Examiner*—Andrew Faile
*Assistant Examiner*—Reuben M. Brown
(74) *Attorney, Agent, or Firm*—Eugene J. Rosenthal

(57) ABSTRACT

When there is an inability to convey motion that is occurring in the frames of a video source by a full-frame-rate transmission, a surrogate effect, other than another form of motion, may be used as a compensation technique to better convey motion to a viewer. The surrogate effect employed may be a) fading, b) wiping, c) dissolving, d) blurring, e) enhancing the contrast, f) enhancing one or more colors, g) enhancing the brightness, h) scaling the image, and i) the like. How the surrogate effect is applied to any frame may be a function of one or more video frames. Optionally, more than one effect may be used in combination. Advantageously, a more continuous sense of motion is perceived by a viewer. In one embodiment of the invention, full-frame-rate video is initially available. A controller monitors the ability to transmit or display full-frame-rate video. In the event that it is determined that, ultimately, full-frame-rate video cannot be displayed to a user, the images of the frames that will be displayed are adjusted to incorporate a surrogate effect that helps to better convey the intended motion to the viewer. The surrogate effect applied may be selected as a joint function of the available frame rate and knowledge of the content, e.g., the specific type of motion, intended to be shown to the viewer.

29 Claims, 2 Drawing Sheets

MOTION DISPLAY TECHNIQUE

TECHNICAL FIELD

This invention relates to the displaying of video with motion where the frame rate of the displayed video is inadequate to fluidly convey that motion.

BACKGROUND OF THE INVENTION

A well known problem in the art of video communication is the inability to fluidly display motion in a video when the frame rate at which the video is displayed must be either less than or greater than the frame rate of the source video. Conventional solutions to this problem are either to display the video at a frame rate that is mismatched to the source frame rate or to attempt to rationalize the frame rates. Such rationalization may be done by either a) dropping frames, e.g., during transmission or prior to display, when the display rate is less than the source rate, or b) by padding frames—with or without interpolation-when the display rate is greater than the source rate. Such solutions are inadequate because of the resulting poor quality, e.g., jumpiness and lack of smooth notion.

Another problem in the art is an inability to transmit frames from a video source to a video display without loss of frames during transmission. Conventional solutions to this problem are to either 1) buffer frames so that there is a stored reserve of frames that can be shown during times when no frames are received or 2) display the last received frame until the next one is received. Again, such solutions are inadequate because of the resulting poor quality, e.g., jumpiness and lack of smooth motion, as well as the fact that the cost of the memory to implement the buffer is not negligible. Also, the buffer length introduces a transmission delay, which can be disconcerting in interactive video applications such as video conferences or gaming.

SUMMARY OF THE INVENTION

We have recognized that, in accordance with the principles of the invention, when there is an inability to convey motion that is occurring in the frames of a video source by a full-frame-rate transmission, a surrogate effect, other than another form of motion, may be used as a compensation technique to better convey motion to a viewer. The surrogate effect employed may be a) fading, b) wiping, c) dissolving, d) blurring, e) enhancing the contrast, f) enhancing one or more colors, g) enhancing the brightness, h) scaling the image, and i) the like. How the surrogate effect is applied to any frame may be a function of one or more video frames. Optionally, more than one effect may be used in combination. Advantageously, a more continuous sense of motion is perceived by a viewer.

In one embodiment of the invention, full-frame-rate video is initially available. A controller monitors the ability to transmit or display full-frame-rate video. In the event that it is determined that, ultimately, full-frame-rate video cannot be displayed to a user, the images of the frames that will be displayed are adjusted to incorporate a surrogate effect that helps to better convey the intended motion to the viewer. In accordance with an aspect of the invention, the surrogate effect applied may be selected as a joint function of the available frame rate and knowledge of the content, e.g., the specific type of motion, intended to be shown to the viewer.

In addition, the same surrogate effect techniques may be employed even when full-frame-rate capability is available, if it is desired to give motion occurring at a first speed within the video the appearance to a viewer of occurring at a second speed. This may be necessary when the desired frame rate is greater than the full frame rate, which may be required for interactive applications, such as simulations or gaming. The controller determines the first speed of the motion and the desired second speed and applies the surrogate effect as appropriate.

DETAILED DESCRIPTION

Figure 1:
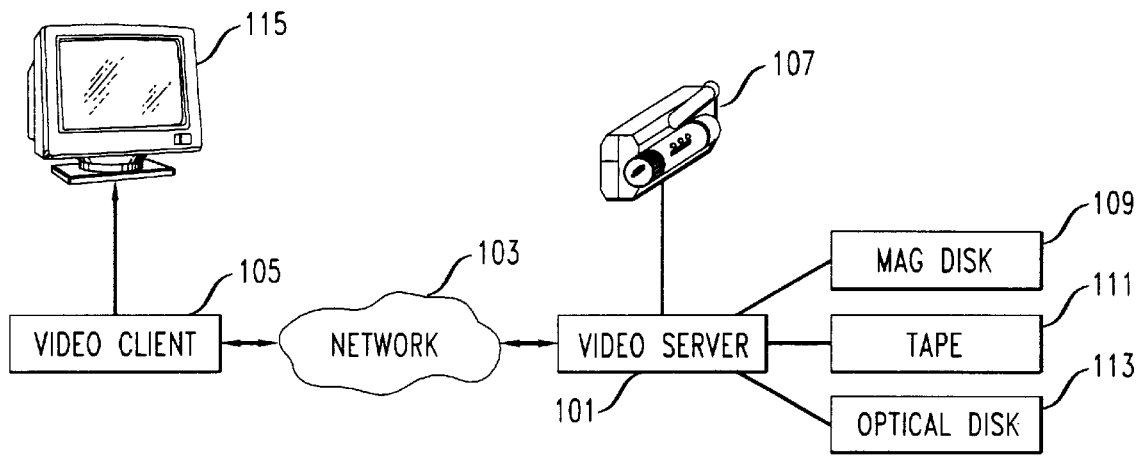
FIG. 1 shows an exemplary video communication system in accordance with the invention.

FIG. 1 shows an exemplary video communication system 100 arranged in accordance with the invention. Video communication system 100 includes video server 101, network 103 and video client 105. Video server 101 transmits selected video at a fixed source frame rate to video client 105 via network 103. Video server 107 may obtain the video information from video camera 107, magnetic disk 109, video tape 111, or optical disk 113. Typically video server 101 formats the video information of the frames into packets and transmits the packets to network 103.

Network 103 attempts to transmit all of the packets to video client 105. However, network 103 is not always entirely successful. This lack of success is typically due to congestion which results in packets being dropped within network 103. The packets that successfully traverse network 103 are supplied to video client 105.

Video client 105 receives the packets from network 103 and reconstructs frames of the original video signal therefrom. For purposes of this invention, it is assumed that any errors within a frame, e.g., as a result of packets dropped or damaged during transmission, are either compensated for by other techniques beyond the scope of this disclosure or they cause the entire frame containing such errors to be dropped. The reconstructed frames are converted into a signal suitable for display on video monitor 115. Video monitor 115 may be a computer monitor, a television, or the like.

Figure 2:
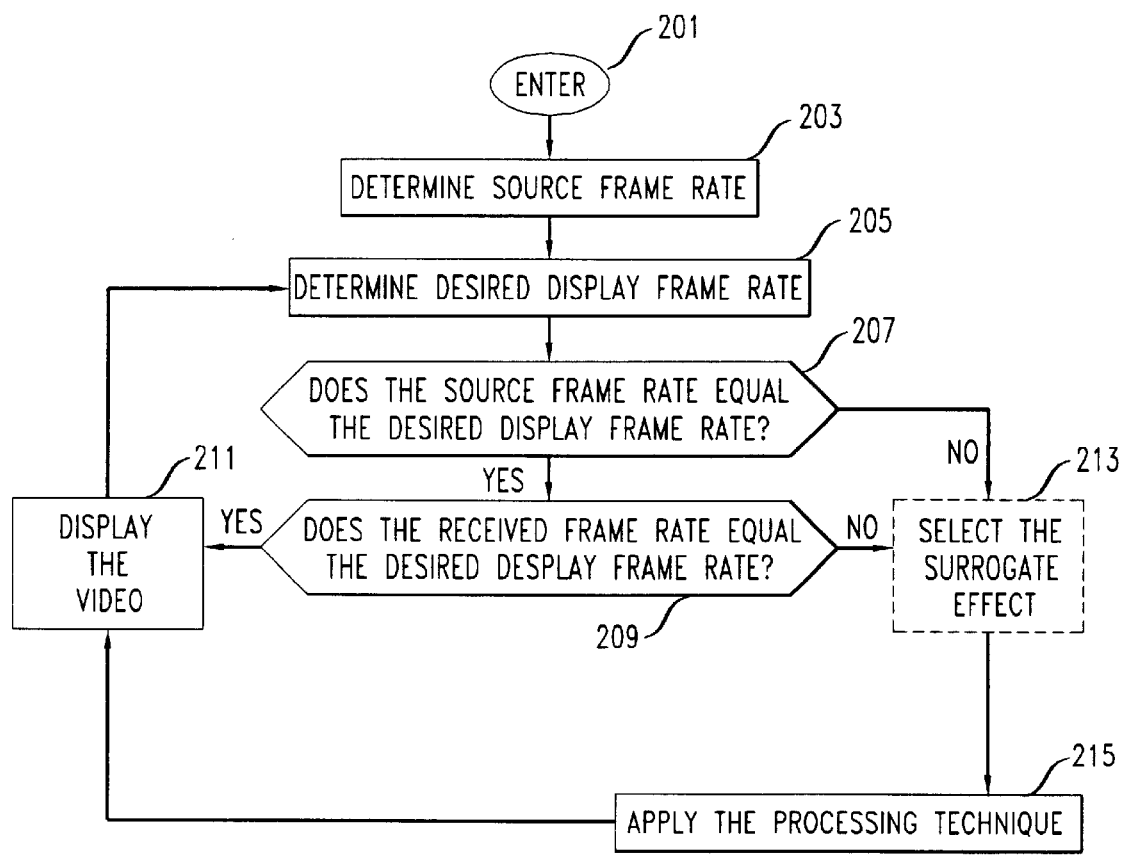
FIG. 2 shows a flow chart for a process by which a video client processes frames of video received in packet format from a network, in accordance with the principles of the invention.

FIG. 2 shows a flow chart for a process by which video client 105 processes frames of video received in packet format from network 103, in accordance with the principles of the invention. The process is entered in step 201 when video information is initially received from network 103. In step 203, the source frame rate is determined. The source frame rate is the frame rate at which the maker of the video intended to have the video shown and achieve full-motion. Typically, this is the rate at which the video was filmed, most often 30 frames per second in the United States. In one embodiment of the invention, header information in at least one of the packets of the first frame specifies what the source frame rate is.

In step 205 the desired display frame rate is determined. The desired frame rated may be fixed, e.g., for static viewing of the video. Alternatively, the desired frame rate may be dynamically changing, e.g., for interactive applications such as where a user is simulating a bicycle ride, the video is the terrain the bicyclist sees, and the frames need to be shown at a rate that is a function of the speed at which the bicycle is moving.

Conditional branch point 207 tests to determine if the source frame rate is equal to the desired display frame rate. The source frame rate may be less than the desired display frame rate for interactive applications, such as the foregoing bicycle simulation, when the bicyclist's speed is greater than the speed at which the camera used to shoot the video footage of the terrain was moving when the video footage was shot. Alternatively, there may simply be a mismatch between the capabilities of the video source and video client 105. For example, video camera 107 may be a low-end, less-than-full-motion camera operating at 10 frames per second (fps) while video client 105 is a high-end, full-motion user workstation capable of displaying 30 fps. Similarly, the source frame rate may be greater than the desired display frame rate for interactive applications, such as the foregoing bicycle simulation, when the bicyclist's speed is less than the speed at which the camera used to shoot the video footage of the terrain was moving when the video footage was shot. Likewise, video camera 107 may be a high-end, full-motion camera operating at 30 fps while video client 105 is a low-end, less-than-full-motion user workstation that is only capable of 10 fps.

If the test result in step 207 is YES, control passes to conditional branch point 209, which tests to determine if the received frame rate equals the desired display frame rate. This test is implemented by checking if a new frame of video has been received at the desired display frame rate and is ready for display. If the test result in step 209 is YES, this means that the source frame rate, the received frame rate, and the desired frame rate all match. In other words, all the frames that need to be displayed are being received and at the rate at which they should be displayed. Therefore, the video can be directly displayed without further processing. Accordingly, control passes to step 211 and the frame is displayed. Control then passes back to step 205 and the process continues as described above.

If the test result in either step 207 or 209 is NO, this indicates that frames are not being received at the rate at which they should be displayed. Therefore, processing of the video is necessary to better convey motion contained within the video to a viewer. Accordingly, control passes to optional step 213 in which a surrogate effect other than another form of motion, is selected as a compensation technique to better convey motion to a viewer. The surrogate effect employed may be selected from a) fading, b) wiping, c) dissolving, d) blurring, e) enhancing the contrast, f) enhancing one or more colors in the frame, g) enhancing the brightness, h) scaling the image, and i) the like. Optionally, more that one surrogate effect may be applied in combination.

Step 213 is optional because the processing technique to be employed may be preset for the entire video. Otherwise, the selection of a surrogate effect may be made in step 213 for a portion of the video, and the portion may be as small as a single frame. The particular technique selected may be as a function of the content of the frame. This may be implemented, for example, by analysis of the content of the frame, such as by video client 105. Alternatively, the surrogate effect to be employed may be specified as pail of the video source and transmitted along with the frames in one or more of the packet headers.

In step 215 the selected surrogate effect is applied to the video. In applying the surrogate effect to any frame, information from one or more frames may be employed. For example, such frames may be stored in memory. Control then passes to step 211 and the process continues as described above.

The process is completed when no further video is indicated to be received, e.g., by receiving an end-of-file indication or by the elapsing of a predetermined period of time without receipt of a frame.

It will be appreciated that video server 101 could actually be transmitting the source video at varying frame rates, e.g., in response to detection of the existence of various conditions at network 103 or video client 105. Additionally video server 101 and network 103 could be cooperating with video client 105, either individually or in combination, to implement the invention.

Figure 3:
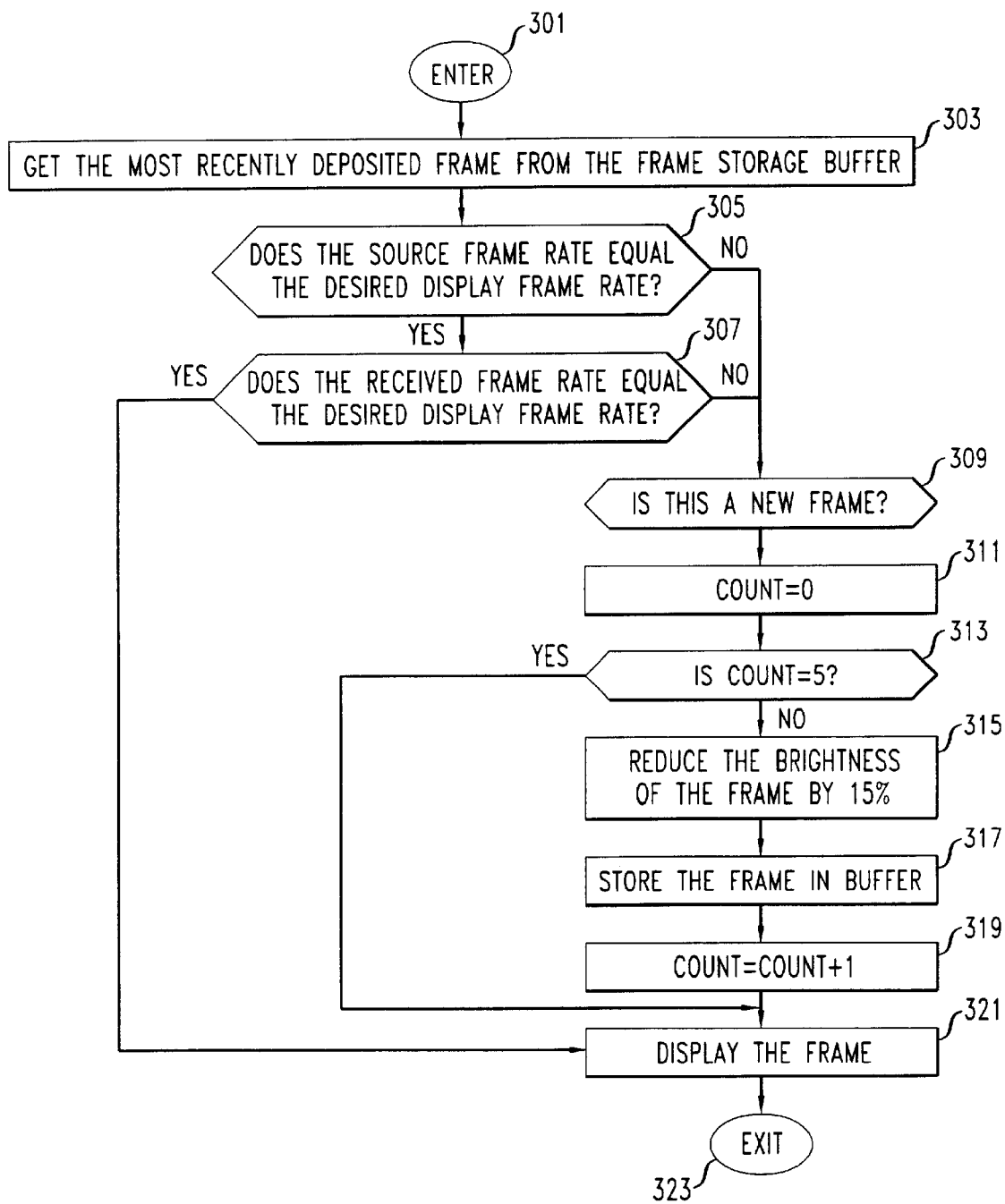
FIG. 3 shows a flow chart for a more specific example of the invention.

FIG. 3 shows a flow chart for a more specific example of the invention. The example shown in FIG. 3 looks at the process that must be performed when it is time to display a frame of video, and it utilizes fading as the surrogate effect should a surrogate effect need to be applied. In particular, at each time that a frame of video must be displayed but not at the source video frame rate, so that a surrogate effect needs to be applied, in the example of FIG. 3 the previously displayed frame is reduced in brightness by 15%.

The process shown in FIG. 3 is entered, in step 301, when it is determined that a new frame of video must be prepared for display, e.g., just before a new frame must begin being displayed. In step 303, the most recently deposited frame of video is retrieved from storage. Next, conditional branch point 305 tests to determine if the source frame rate is equal to the desired display frame rate. If the test result in step 305 is YES, control passes to conditional branch point 307, which tests to determine if the received frame rate equals the desired display frame rate. If the test result in step 307 is YES, this means that the source frame rate, the received frame rate, and the desired frame rate all match. In other words, all the frames that need to be displayed are being received and at the rate at which they should be displayed. Thus the frame which was retrieved is the most recently received frame, and it can be directly displayed without further processing. Accordingly, control passes to step 321 and the frame is displayed. The process then exits in step 323.

If the test result in either step 305 or 307 is NO, this indicates that processing of the video is necessary to better convey motion contained within the video to a viewer. Accordingly, control passes to step 309, in which the process of applying the fading surrogate effect is begun. More specifically, conditional branch point 309 tests to determine if the frame retrieved in step 303 is a new frame, i.e., it is a frame that has not yet had any surrogate effect processing performed on it. If the test result in step 309 is YES, control passes to step 311, in which a counter variable, COUNT, is set to zero. If the test result in step 309 is NO, or after execution of step 309, control passes to conditional branch point 313, which tests to determine if count is equal to five. This test is used to control the fading of the frame so that it does not fade to the extent that the frame becomes practically invisible. If the test result in step 313 is YES, indicating that the frame has been faded by the maximum allowable amount, control passes to step 321 to display the frame. The process then exits in step 323.

If the test result in step 313 is NO, indicating that the frame has not been faded by the maximum allowable amount, control passes to step 315, and the brightness of the frame is reduced by 15%. The brightness-reduced frame is then stored back in the frame buffer in step 317, and the value of COUNT is incremented in step 319. Thereafter, the frame stored in the frame buffer is displayed in step 321 and the process is exited in step 323.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in processing frames of a video signal in which motion occurs, said video signal having a source frame rate, comprising the steps of:
   determining that the video signal is to be displayed at a second frame rate different from the source frame rate; and
   applying a surrogate effect, other than another form of motion, to a portion of the video signal when the video signal is displayed at the second frame rate whereby the motion is better conveyed to a viewer.

2. The invention as defined in claim 1 wherein said portion of the video signal is a frame of the video signal.

3. The invention as defined in claim 1 wherein said portion of the video signal is a plurality of frames of the video signal.

4. The invention as defined in claim 1 wherein said surrogate effect is one of a group consisting of: fading, wiping, dissolving, blurring, contrast enhancing, enhancing one or more colors, brightness enhancing, scaling.

5. The invention as defined in claim 1 wherein said surrogate effect is a combination of at least two effects.

6. The invention as defined in claim 1 wherein said surrogate effect is a combination of at least two effects from the group consisting of: fading, wiping, dissolving, blurring, contrast enhancing, enhancing one or more colors, brightness enhancing, scaling.

7. The invention as defined in claim 1 wherein, in said applying step, said surrogate effect is applied to a frame of said video signal as a function of information in one frame of said video signal.

8. The invention as defined in claim 1 wherein, in said applying step, said surrogate effect is applied to a frame of said video signal as a function of information in at least one frame of said video signal.

9. The invention as defined in claim 1 further including the step of determining said surrogate effect for application in said applying step.

10. The invention as defined in claim 1 further including the step of determining said surrogate effect for application in said applying step as a function of a plurality of surrogate effects using as basis for determining said surrogate effect information from at least one frame of said video signal.

11. The invention as defined in claim 1 wherein said second frame rate is greater than said source frame rate.

12. The invention as defined in claim 1 wherein said second frame rate is less than said source frame rate.

13. Apparatus for use in video signal processing, comprising:
   means for receiving a video signal having a source frame rate; and
   a processor for determining that the video signal is to he displayed at a second frame rate different from the source frame rate and for applying a surrogate effect, other than another form of motion, to a portion of the video signal when the video signal is displayed at the second frame rate whereby the motion is better conveyed to a viewer.

14. The invention as defined in claim 13 wherein said video signal is received from a network.

15. The invention as defined in claim 13 wherein second frame rate is greater than said source frame rate.

16. The invention as defined in claim 13 wherein second frame rate is less than said source frame rate.

17. The invention as defined in claim 13 wherein second frame rate is less than said source frame rate because frames of said source video are not available at a time when they need to be displayed.

18. The invention as defined in claim 13 wherein said surrogate effect is selected from the group consisting of: fading, wiping, dissolving, blurring, contrast enhancing, enhancing one or more colors, brightness enhancing, scaling.

19. Apparatus for use with a video transmission system that includes a video server and a network, comprising:
   a video signal receiver adapted to receive video signals transported by said network; and
   a processor for determining if said video signal, as received by said video signal adapter, is to be displayed at a second frame rate different from the source frame rate as supplied by said video server and for applying a surrogate effect, other than another form of motion, to a portion of the video signal, as received by said video signal adapter, when the video signal is displayed at the second frame rate.

20. The invention as defined in claim 19 wherein said surrogate effect selected is selected as a function of a type of motion being conveyed.

21. The invention as defined in claim 20 wherein said surrogate effect is selected from the group consisting of: fading, wiping, dissolving, blurring, contrast enhancing, enhancing one or more colors, brightness enhancing, scaling.

22. The invention as defined in claim 19 wherein said video signal is arranged into packets.

23. The invention as defined in claim 22 wherein said surrogate effect selected is selected as a function of information encoded in at least one of said packets.

24. The invention as defined in claim 22 wherein said surrogate effect selected is selected as a function of information encoded in a packet that is transmitted along with said packets of said video signal.

25. A method for use in processing frames of a video signal in which motion occurs, said video signal having a source frame rate, comprising the steps of:
   determining that the video signal is to be displayed at a second frame rate different from the source frame rate; and
   applying a surrogate effect, other than another form of motion, to a portion of the video signal when the video signal is displayed at the second frame rate whereby the motion is better conveyed to a viewer;
   wherein said surrogate effect is one of a group consisting of: fading, wiping, dissolving, blurring, scaling.

26. The invention as defined in claim 25 further including the step of determining said surrogate effect for application in said applying step.

27. The invention as defined in claim 25 further including the step of determining said surrogate effect for application in said applying step as a function of a plurality of surrogate effects using as basis for determining said surrogate effect information from at least one frame of said video signal.

28. The invention as defined in claim 25 further including the step of selecting said surrogate effect from an available plurality of surrogate effects.

29. The invention as defined in claim 25 wherein said surrogate effect selected is selected as a function of a type of motion being conveyed.

* * * * *